(12) United States Patent
Wieczorek et al.

(10) Patent No.: US 12,134,354 B2
(45) Date of Patent: Nov. 5, 2024

(54) VEHICLE TRACKING FOR A CAMERA WING SYSTEM

(71) Applicant: Motherson Innovations Company Limited, London (GB)

(72) Inventors: Romeo Wieczorek, Stuttgart (DE); Matthias Koller, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 108 days.

(21) Appl. No.: 17/992,987

(22) Filed: Nov. 23, 2022

(65) Prior Publication Data

US 2023/0173983 A1 Jun. 8, 2023

(30) Foreign Application Priority Data

Dec. 2, 2021 (DE) .......................... 102021131821.1

(51) Int. Cl.
| | |
|---|---|
| *B60R 1/28* | (2022.01) |
| *B60Q 1/24* | (2006.01) |
| *B60R 11/04* | (2006.01) |
| *G03B 15/02* | (2021.01) |
| *G06V 20/56* | (2022.01) |
| *H04N 5/262* | (2006.01) |
| *H04N 7/18* | (2006.01) |
| *H04N 23/56* | (2023.01) |
| *H04N 23/695* | (2023.01) |

(Continued)

(52) U.S. Cl.
CPC ................ *B60R 1/28* (2022.01); *B60Q 1/249* (2022.05); *B60R 11/04* (2013.01); *G03B 15/02* (2013.01); *G06V 20/56* (2022.01); *H04N 5/2624* (2013.01); *H04N 7/183* (2013.01); *H04N 23/56* (2023.01); *H04N 23/695* (2023.01); *B60R 2011/0085* (2013.01); *B60R 2011/0092* (2013.01); *H04N 5/77* (2013.01)

(58) Field of Classification Search
None
See application file for complete search history.

(56) References Cited

U.S. PATENT DOCUMENTS

| | | |
|---|---|---|
| 2009/0096937 A1 | 4/2009 | Bauer et al. |
| 2013/0106993 A1 | 5/2013 | Schofield et al. |
| | (Continued) | |

FOREIGN PATENT DOCUMENTS

| | | |
|---|---|---|
| DE | 102015218033 A1 | 3/2017 |

OTHER PUBLICATIONS

German Patent and Trademark Office, Office Action for 10 2021 131 821.1, dated Aug. 2, 2022.

*Primary Examiner* — Eileen M Adams
(74) *Attorney, Agent, or Firm* — Jones Day

(57) ABSTRACT

A camera wing system, a vehicle comprising such camera wing system, and a method to operate such a camera wing system are provided, comprising a camera to record a field of view of the camera in a scenery at least around a rear part of the vehicle, where a presented view is provided to a driver of the vehicle as a part of the field of view, wherein the camera wing system is adapted to automatically panning the presented view of the camera to another presented view different from the previous presented view in order to keep a point of interest of the rear part of the vehicle within the presented view provided to the driver regardless of a driving situation of the vehicle.

10 Claims, 3 Drawing Sheets

(51) Int. Cl.
*B60R 11/00* (2006.01)
*H04N 5/77* (2006.01)

(56) References Cited

U.S. PATENT DOCUMENTS

| | | | |
|---|---|---|---|
| 2018/0284460 A1* | 10/2018 | Cheng | G02B 27/0172 |
| 2020/0405398 A1* | 12/2020 | Amanatullah | G02B 27/017 |
| 2021/0306546 A1* | 9/2021 | Jonsson | H04N 23/11 |
| 2022/0396209 A1* | 12/2022 | Sharma | G06V 10/803 |
| 2023/0119137 A1* | 4/2023 | Vedantam | G06V 20/597 |
| | | | 340/576 |

* cited by examiner

VEHICLE TRACKING FOR A CAMERA WING SYSTEM

CROSS-REFERENCE TO RELATED APPLICATIONS

This application claims priority to German Patent Application No. DE 10 2021 131 821.1, filed on Dec. 2, 2021, the entirety of which is incorporated herein by reference.

FIELD

A camera wing system is provided with a camera able to automatically keep a point of interest of the rear part of the vehicle within the part of the field of view provided to the driver as a presented view regardless of a driving situation of the vehicle. Also provided are a vehicle comprising such camera wing system and a method to operate such a camera wing system.

BACKGROUND

Motor vehicles are usually equipped with exterior mirrors on both sides in the driver's field of view, which detect the surrounding of the motor vehicle in a rear-view direction. Mirror systems consisting of several mirrors have the disadvantage that they must be adjusted carefully not to generate non-visible zones between the provided rear views of each mirror leading to an inadequately fulfilled mirror purpose. Therefore, common mirror systems are replaced by rear view camera systems recording the surrounding of the vehicle. The camera system records image data with image sensors or pixelated imaging arrays and feed the image data to a control unit for processing the image data. The processed rear-view image is displayed on at least one monitor as a screen in the field of vision of a driver. The rear-view image being of interest for the driver depends on the dimensions of the vehicle. Especially in case of vehicles pulling trailers, the rear-view image adjusted for the vehicle without the trailer does not corresponds to the required rear-view image showing the trailer to enable the driver to drive safe.

DE 202018104862 discloses a system for adjusting vehicle mirrors in case of a trailer is hitched to the vehicle. A memory device stores a saved mirror position for hitched trailers. In case of an identified trailer, the mirror is move from its current position to the saved mirror position. However, the mirror positions (with and without trailers) are constant during driving the vehicle (with and without trailers). Especially in case of vehicles with hitched long trailers driving on curved roads, the rear view provided by the mirror even in the saved mirror position does not continuously show the trailer due to noticeable turning of the trailer in tight curves. This leads to temporarily non-safe driving conditions since the driver cannot be sure that the trailer keeps on the road or collides with other objects in the adjacent environment.

It would be desirable to provide a solution to the disadvantages of the prior art, especially to enable the driver to drive the vehicle in safe driving conditions even on curvy roads.

SUMMARY

It is an object of the disclosure to provide a rear-view system enabling a driver of a vehicle to drive the vehicle in safe driving conditions even on curvy roads.

This problem is solved by a camera wing system for a vehicle comprising at least one camera to record a field of view of the camera in a scenery at least around a rear part of the vehicle, where a presented view is to be provided to a driver of the vehicle as a part of the field of view, wherein the camera wing system is adapted to automatically panning (or moving) the presented view of the camera to another presented view different from the previous presented view in order to keep a point of interest of the rear part of the vehicle, preferably of a trailer as rear part of the vehicle, within the presented view provided to the driver regardless of a driving situation of the vehicle.

The term "camera wing system" denotes the component arranged at the side of the vehicle at a position suitable to record at least the rear view from the vehicle. The position of the camera wing system might be the same as for conventional vehicle mirror systems. Due to the possibility to display the recorded scenery inside the vehicle on an image display, the camera wing system might be arranged at a position outside the field of view of the driver of the vehicle. The wing system comprises an arm or wing on which the camera is installed so that the camera is positioned over the wing somewhat away from the chassis of the vehicle so that the chassis of the vehicle cannot restrict the field of view of the camera, or can only partially restrict the field of view of the camera.

The term "vehicle" denotes any motor driven vehicle with or without trailers driven be a driver, where the driver requires information about persons, other vehicles or objects in the near surrounding of the vehicle, especially around the trailer if present, to be able to drive safety. As an example, motor vehicles are cars or trucks, especially when pulling trailers. The term "driving situation" denotes the direction, in which the vehicle is currently driven. The common driving situation is driving straight ahead, while cornering is a different driving situation. Other driving situations include reversing, parking, or turning. The latter can be a special form of cornering. Depending on the driving situation, the requirements for the keeping the point of interest within the field of view change due to the present driving situation.

The term "camera" denotes any device capable of recording and/or recognizing the environment of a vehicle and of displaying this recognized and/or recorded environment on an image display so that a driver can process the environment as driving information based on the image display. The camera might be an infrared (IR) camera. IR cameras will increase the visibility of objects during nighttime. Especially CCD or CMOS cameras can detect near infrared (NIR) wavelengths not detectable by the human eye. The NIR denotes light with wavelengths within a spectral range between 700 nm and 1400 nm. NIR can rely on the sun's invisible infrared (IR) radiation during daytime operation. During nighttime operation, the NIR light may be provided by IR light sources of the illumination system illuminating the scenery and the field of view, where the reflected light is recorded by the camera. To be able to be used during nighttime, the camera must be sensitive at least to a part of the spectrum of the light emitted by the light sources of the illuminating system. Preferably the camera has a sensitivity for light up to 1000 nm along with sensitivity to the human visible spectrum. This allows to capture daytime images from the field of view with visible light and nighttime images from the field of view with help of IR light received from the scenery illuminated with IR light by use of a corresponding IR illumination system of the camera wing system.

The term "field of view" denotes the extent of the observable world that is "seen" (recorded) at any given moment by the camera depending on the alignment of the camera. The field of view might be only a part of the observable world in the scenery. The field of view relates to an angular field of view specified in degrees in vertical and horizontal direction. The recorded field of view can be displayed to the driver by camera wing system on a corresponding display connected to the camera wing system. Here, only a part of the recorded field of view is presented to the driver as presented field of view in order not panning the camera but the presented field of view. However, in some embodiments the camera is arranged as panning camera be able to move the field of view as well. In some embodiments the display might be part of the camera wing system. The field of view is directed to the areas of interest for the driver to be able to drive the vehicle safety without endangering other persons, objects, or vehicles in the field of view, or damaging the own vehicle. The areas of interest might by the rear and side views of the vehicle, preferably on both sides of the vehicle as well as front views.

The term "a scenery around the vehicle" denotes the observable world about the vehicle eventually comprising a part of the vehicle, which might be of interest for the driver. In daytime operation, the overall brightness might be enough to observe the complete observable world in the field of view of the camera. In nighttime operation the observable parts within the field of view might be restricted to the parts, which are illuminated by the illumination system. Objects not being illuminated might be not recorded by the camera due to the too low level of light being reflected from these "dark" objects.

The term "illuminating system" denotes any system suitable to emit light of a certain wavelength spectrum of a certain intensity in a certain direction. The illumination system comprises light sources and optical components to shape the emitted light beam to reliable illuminate the scenery to be observed in the field of view of the camera. The illumination system comprises at least one light source. In other embodiments multiple light sources are arranged within the illumination system to be able to illuminate objects in different directions. The one light source or the multiple light sources might be established by an array of light sources providing one combined light source, which combined light is shaped by optical components. The illumination system may use LEDs emitting IR light of approximately 940 nm, preferably high intensity LEDs. For active lighting of the scenery during nighttime, objects at 20 m distance or more become visible by using an array of five LEDs as the light sources in the illumination system to illuminate the objects. However, the illumination system must fulfill the requirements for human eye safety conditions. In case of using LEDs as light sources in the illuminating system, an illuminated scenery at a distance of less than 5 m should be illuminated by an LED power of less than 100 mW. Up to 500 mW can be applied for distances between 5 m and 10 m. 2 W can be applied for distances between 15 m and 20 m. For more than 25 m, there is no special restriction for the power of the LEDs resulting from the human eye safety condition. Beam shaping elements to direct the light emitted by the illuminating system to a certain direction are arranged in a wing of the camera wing system with a first wing surface directing towards the scenery in a field of view of the camera, where at least a part of the beam shaping element may establish a part of the first wing surface. The wing surface might be made of dark or opaque Plexiglas material or other material allowing IR light from the light sources to pass the wing surface material. In this case, camera wing systems can be provided with a good aesthetic appearance. Injection-molded curvatures of an IR-transmissive material can be placed in the first wing surface to meet both the optical and aesthetic requirements of the camera wing system. In this case, the injected material can be a two-component injection molding, or the bulge can be made of a single material. These bulges may be round perpendicular to the direction of emission, for example, approximately 38 mm in diameter with a thickness in the direction of the beam of approximately 5.5 mm. In case of multiple optical system, multiple curvatures can be present.

The camera wing system is adapted to automatically panning the presented view of the camera instead of panning the camera. However, the field of view of the camera might be also moved by panning (turning or shifting) the camera or components of the camera, such as one or more optical beam shaping elements, e.g., lenses, reflectors etc., to adapt the direction of the light cone entering the camera and being recorded by the recording component of the camera.

The automatically panning of the presented view of the camera keeps the point of interest of the rear part of the vehicle, preferably of a trailer of the vehicle, within the presented view provided to the driver regardless of a driving situation of the vehicle ensuring that the point of interest is always visible to the driver within the movable range of the presented view. Driving situations, where the point of interest is outside the movable range of the presented view (outside the available field of view for the camera) are rare and extreme driving conditions that do not occur on ordinary curvy roads. Therefore, the camera wing system according to the present invention as a rear-view system enables the driver of the vehicle to drive the vehicle in safe driving conditions even on curvy roads.

In another embodiment the point of interest is a recognized prominent part of the vehicle. The prominent part represents a special point on the rear part of the vehicle, for example the rear edge, a rear wheel or a laterally protruding bumper or another prominent and therefore easily recognizable part of the vehicle or trailer. This prominent part should be located at or near the rear end of the vehicle or trailer, so that the driver can keep an eye on the rear part of the vehicle or trailer in the corresponding display of the camera wing system while driving.

In another embodiment the recognized prominent part of the vehicle is a distinctive mark affixed to the vehicle. A specially attached mark (or tag) can be designed in such a way that it can be detected particularly reliably and easily, and the camera can then be aligned accordingly, regardless of the driving situation. The mark might be a sticker or reflector attached to the surface of the vehicle at a prominent part of the vehicle, e.g. on the rear side at the end of a trailer of the vehicle. The distinctive mark might be a signal source, which can be easily detected, e.g. sending out light of a certain wavelength. The light from the signal source detected by the camera can, for example, be suppressed in the rear-view image for the driver by software, for example with suitable processing filters. Therefore, it would be advantageous if the signal source emits light in a narrow wavelength spectrum, advantageously in a non-visible spectral range, for example in the infrared signal range.

In another embodiment the point of interest is recognized by a suitable optical recognition software installed and executed on a control unit of the camera wing system. During object recognition by means of the applied software, a prominent point such as the rear wheel of a truck or trailer or other prominent points can be found and, if necessary, stored as a coordinate in the software. The camera wing system records image data with image sensors or pixelated imaging arrays and feed the image data to the control unit for processing the image data. The processed rear-view image is displayed as presented view on at least one monitor as a screen in the field of vision of a driver. The control unit might be a chip with processor and data storage capability.

In another embodiment the control unit is adapted to further control the camera and the automatic panning of the presented view of the camera with respect to the recognized point of interest and to further select a part of the field of view to be presented to the driver for driving the vehicle as the presented view. Therefore, the camera does not need actuators for panning the camera or to adapt the alignment of beam shaping elements of the camera in order to move the field of view observed by the camera. Here, panning is applied to the presented view instead to the camera. In case of nighttime operation, the illumination of the may only cover the field of view only partly, the control unit might also be connected to actuators to control any actuator action panning the camera on demand. The camera records a field of view being wider than the image presented to the driver. Therefore, it is able to select a suitable part of the recorded field of view to be presented to the driver. The selection, which part of the field of view is presented to the driver as the presented view is made by the control unit based on predetermined rules stored on the control device.

In another embodiment the field of view recorded by the camera is divided into a standard area and at least one second area adjacent to the standard area, preferably the standard area is arranged between two second areas. A common camera usually provides a more or less rectangular field of view to the driver. Here, the center and second area are preferably also rectangular areas. In other embodiments the standard area might be surrounded by the second area. In this case the standard area might be a circular area.

In another embodiment, where the control unit is adapted not panning the presented view of the camera as long as the point of interest is present within the standard area of the field of view, the control unit is adapted to select the standard area of the field of view to be presented to the driver as a first presented view. The selected standard area might be the standard selection showing the rear end of the vehicle and the environment around this end in a straight driving situation.

In another embodiment, where in case of the point of interest approaches the second area due to a changed driving situation, the control unit is adapted panning the presented view of the camera in such a way, that the point of interest stays in a middle position in a second present view, which is selected to be presented to the driver instead of the first presented view. This selection corresponds to a driving situation, where the vehicle drives a curved road with not too tight curves.

In another embodiment, where in case of the presented view cannot panning further while the point of interest further moves away from the standard area due to the present driving situation, the control unit is adapted keep the position of the presented view constant to let the point of interest moving through the selected second present view. This selection corresponds to a driving situation where the vehicle drives through a tight curve.

In another embodiment, where in case of the point of interest leaves the recorded field of view, the control unit is adapted to provide a warning signal to the driver. The warning signal might by an acoustic and/or visible signal to the driver notifying an extreme driving situation to the driver, where the camera is no longer able to keep the point of interest inside the field of view provided to the driver. The warning signal might by also provided inside the image display in a suitable way, e.g. as icon or underlaying color of the image.

In another embodiment the camera wing system comprising an illuminating system to emit light to illuminate the field of view of the camera, the camera being sensitive to the light emitted by the illumination system, where the illuminating system comprises at least one optical system comprising one or more light sources and suitable beam shaping elements to define one or more emission cones per optical system. The beam shaping elements might be lenses, reflectors, filters, and other suitable optical elements.

In another embodiment at least one of the light sources, preferably all light sources, is an infrared light source, preferably an infrared LED or an array of infrared LEDs. Here, the near infrared spectrum with wavelengths between 780 nm and 1400 nm is preferable, because several commonly used light sources are available for NIR. Many materials transparent in the NIR are available to manufacture the camera wing system with the illumination system inside. Cameras with conventional silicone chips are available. The reflection behavior of many materials is at least very similar in NIR and the spectrum range visible for human eyes enabling to illuminate a scenery at nighttime with a NIR based illumination system while still be able to provide a realistic picture of the scenery to the driver obtained by the recorded NIR light reflected from the objects being illuminated. Furthermore, the degree of reflection of black clothes is much higher with NIR light resulting in a better recognition of "black" objects during nighttime. Also, vegetation is brighter in NIR compared to visible light. As a further advantage, NIR wavelengths passes through fog, haze, and rain. The illumination system may use LEDs emitting IR light of approximately 940 nm, preferably high intensity LEDs. The LED might be arranged on a circular PCB with the IR LEDs arranged around the center of the PCB. The number of circular arranged IR LEDs might be six LED, preferably four LEDs in order to reduce the size of the PCB making it easy to fit the PCB into the wing of the camera wing system. Furthermore, a cone reflector as a beam shaping element might be arranged over the IR LEDs to project the IR light in one direction. Along with the cone reflector, one or more, preferably each, LED may comprise a micro lens to focus the light on the desired direction.

In another embodiment the camera comprises a switchable light filter for day and night operation. For nighttime this filter is preferably an IR filter allowing only IR light to pass through so that the camera only captures IR light reflected from the illuminated objects in the field of view. During daytime the filter preferably is an optical filter stopping direct sunlight entering the camera aperture, so that the camera captures images in natural colors. Such filters for daylight mode are advantageous since the visible ambient light is sufficient during daytime. In an alternative embodiment, an IR filter present for daytime operation could be switched away during night operation to allow all reflected IR light to reach the camera during nighttime.

The invention also relates to a vehicle comprising at least one camera wing system according to the present invention and a point of interest as a prominent part of the vehicle to be recognized by the camera wing system in a field of view of the camera and at least one image display, where a selected part of the field of view is presented to the driver as a presented view. Therefore, the vehicle comprising a camera wing system according to the present invention as a rear-view system enables the driver of the vehicle to drive the vehicle in safe driving conditions even on curvy roads for the same reasons as discussed before.

In another embodiment the vehicle comprises at least two camera wing systems, where at least one of the camera wing systems is arranged on each side of the vehicle in order to separately detect point of interests on both sides of the vehicle, where a straight driving is assumed when detecting the points of interests on both sides of the vehicle simultaneously, preferably a cornering is detected when detecting only one point of interests only on one side of the vehicle. If both cameras on the left and right side detect the point of interest, a straight ahead is assumed. If the point of interest is only detected on one side, a corresponding turn is assumed, whereby the inner curve is on the side on which the point of interest was detected. Thus, the recognition with two camera wing systems can also be used for a recognition of the driving situation.

In an embodiment the vehicle further comprises a driving situation detection system in order to adapt one or more emission cones emitted by an illumination system of the camera wing system in emission direction and/or cone angle depending on the detected driving situation of the vehicle to illuminate the scenery in the field of view being of interest for a driver due to the detected driving situation. The driving detection system can, for example, measure the edge position or the wheel angle for possible cornering. It could determine the speed, as different speeds have different lighting requirements for the illumination system. It could measure the articulation angle between the tractor and trailer to determine the degree of cornering. Other measurement parameters such as road surface condition, lane keeping, lane changes and blind spot and rear obstacle impact to determine the driving situation could also be determined.

In an embodiment, a method to operate a camera wing system mounted on a vehicle comprising at least one camera may include the following steps:
  recording a field of view in a scenery around the vehicle by the camera,
  providing at least a part of the recorded field of view to the driver as a presented view,
  automatically moving the presented view of the camera to another presented view different from the previous presented view in order to keep a point of interest of the vehicle within the presented view regardless of a driving situation of the vehicle by the camera wing system, and
  providing the another presented view to the driver.

Therefore, in an embodiment, the method to operate a camera wing system as a rear-view system enables the driver of the vehicle to drive the vehicle in safe driving conditions even on curvy roads for the same reasons as discussed before.

In an embodiment, where the camera wing system further comprising a control unit is adapted to execute at least one of the following steps:
  recognizing the point of interest by a suitable optical recognition software installed and executed on the control unit,
  not moving the presented view of the camera as long as the point of interest is present within a standard area of the field of view, where the standard area of the field of view is selected to be presented to the driver as a first presented view,
  moving the presented view of the camera in such a way, that the point of interest stays in a middle position in a second present view, which is selected to be presented to the driver instead of the first presented view in case of the point of interest approaches a second area adjacent to the standard area due to a changed driving situation,
  keeping the position of the presented view constant to let the point of interest moving through the selected second present view in case of the presented view cannot panning further while the point of interest further moves away from the standard area due to the present driving situation, preferably followed by sending out a warning signal to the driver in case of the point of interest leaves the recorded field of view.

The above listed embodiments can be used individually or in any combination to provide the device and the process in accordance with the invention.

BRIEF DESCRIPTION OF THE DRAWINGS

These and other aspects of the invention are shown in detail in the illustrations as follows.

DETAILED DESCRIPTION OF EMBODIMENTS

Figure 1:
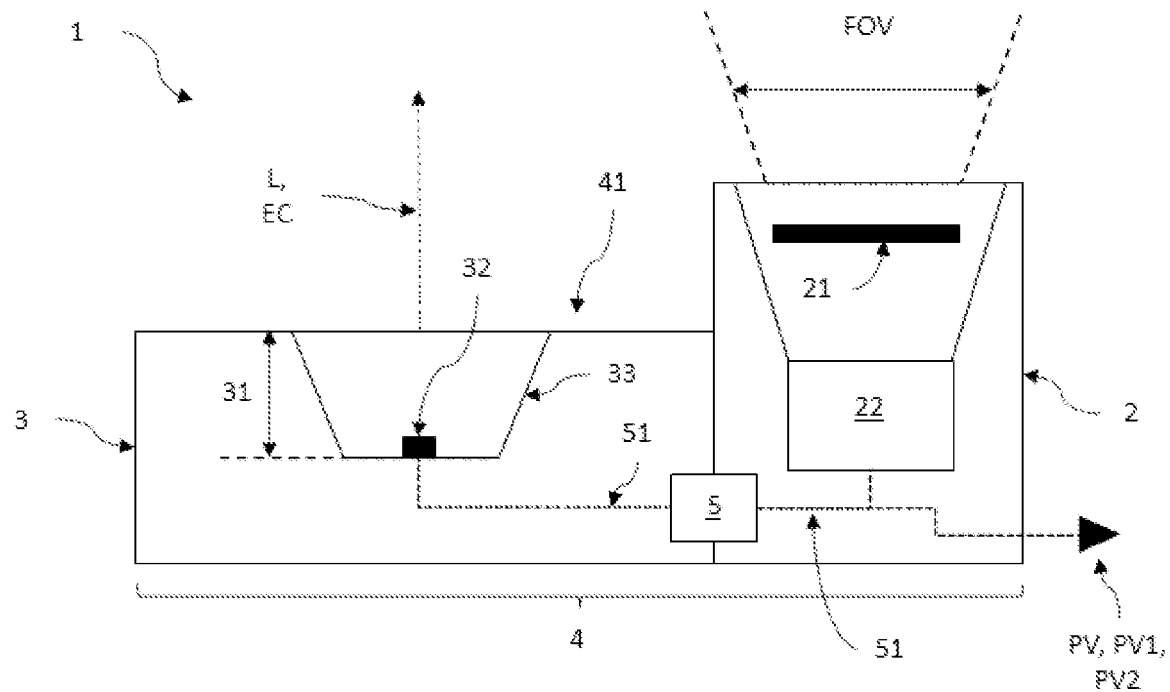
FIG. 1: a schematic illustration of one embodiment of the camera wing system in a top view.

FIG. 1 shows a schematic illustration of one embodiment of the camera wing system 1 according to the present invention in a top view comprising one camera 2 to record a field of view FOV of the camera 2 in a scenery at least around a rear part of the vehicle 10, where a presented view PV is provided to a driver 60 of the vehicle 10 as a part of the field of view FOV (see FIG. 2 for more details), wherein the camera wing system 1 is adapted to automatically panning the presented view PV of the camera 2 to another presented view PV2 different from the previous presented view PV1 in order to keep a point of interest 50 of the rear part of the vehicle 10, preferably of a trailer 40 as rear part of the vehicle 10, within the presented view PV provided to the driver 60 regardless of a driving situation DS of the vehicle 10. The point of interest 50 see FIG. 3 for more details is recognized by a suitable optical recognition software installed and executed on a control unit 5 of the camera wing system 1. The camera wing system 1 further comprising an illuminating system 3 to emit light to illuminate the field of view FOV of the camera 2, the camera 2 being sensitive to the light emitted by the illumination system 3, where the illuminating system 3 comprises at least one optical system 31 comprising one or more light sources 32 and suitable beam shaping elements 33 to define one or more emission cones EC per optical system 31, where at least one of the light sources 32, preferably all light sources 32, is an infrared light source, preferably an infrared LED or an array of infrared LEDs. The camera 2 furthermore comprises a switchable light filter 21 for day and night operation. In this embodiment the control unit 5 is installed in the wing 4 of the camera wind system 1. In other embodiments the control unit 5 might be arranged within the interior of the vehicle 10 at a suitable position.

Figure 2:
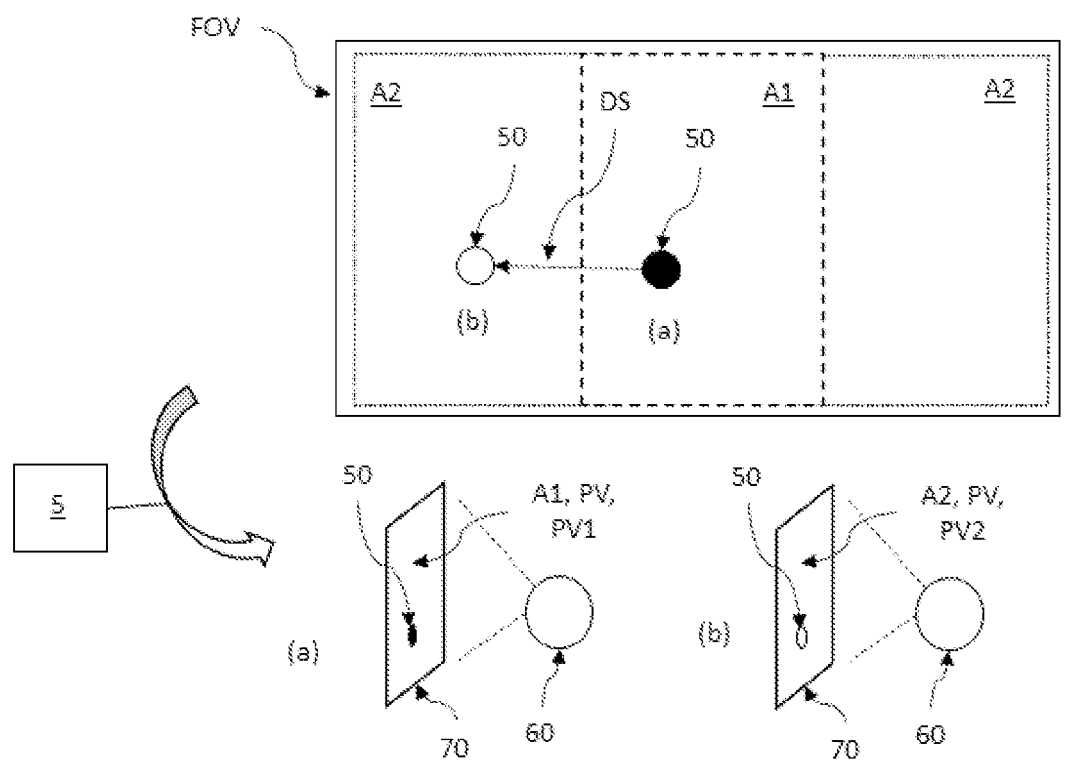
FIG. 2: a schematic view of the field of view with different areas to be selected for being presented to the driver on an image display.

FIG. 2 shows a schematic view of the field FOV of view with different areas A1, A2 to be selected for being presented to the driver 60 on an image display 70 as the presented view PV, PV1, PV2. The control unit 5 controls the camera 2 and the automatic panning of the presented view PV of the camera 2 with respect to the recognized point of interest 50 and selects a part of the field of view FOV to be presented to the driver 60 for driving the vehicle 10 depending on the position of the point of interest 50 in the field of view FOV available for the camera 2. The field of view FOV recorded by the camera 2 is divided into a standard area A1 and two adjacent second areas A2 covering the complete field of view of the camera 2. The control unit 5 is adapted not panning the presented view PV of the camera 2 as long as the point of interest 50 (black circle in A1) is present within the standard area A1 of the field of view FOV. Subsequently the control unit 5 is adapted to select the standard area A1 of the field of view FOV to be presented to the driver 60 as a first presented view PV1. In case of a changing driving situation DS, the point of interest 50 may move to another position in the recorded field of view FOV, here shown as open circle in area A2 after having left the standard area A1. In case of the point of interest 50 enters the second area A2, the control unit 5 is adapted panning the presented view PV of the camera 2 in such a way, that the point of interest 50 stays in a middle position in a second present view PV2, which is now selected to be presented to the driver 60 instead of the first presented view PV1. In case of the presented view cannot panning further while the point of interest 50 further moves away from the standard area A1 due to the present driving situation DS, the control unit 5 is adapted keep the position of the presented view constant to let the point of interest 50 moving through the selected second present view PV2. In case of the point of interest 50 leaves the recorded field of view FOV, the control unit 5 is adapted to provide a warning signal 190 to the driver 60 (see FIG. 4).

Figure 3:
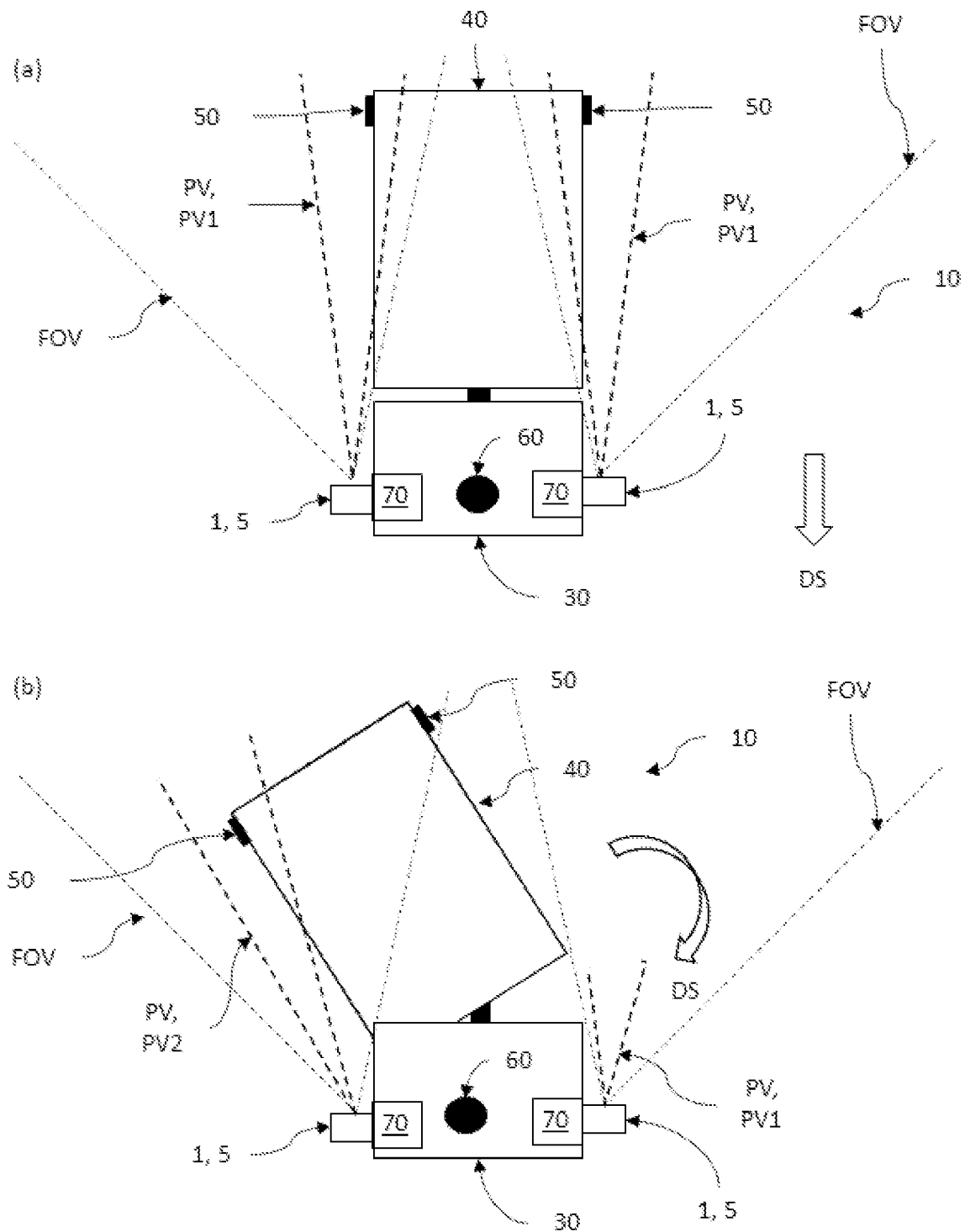
FIG. 3: a schematic illustration of a vehicle, where the camera wing system is adapted to the detected driving situation for (a) straight driving and (b) driving around a curve.

FIG. 3 shows a schematic illustration of a vehicle 10 according to the present invention, where the camera wing system 1 is adapted to the detected driving situations DS for (a) straight driving and (b) driving around a curve. The point of interest 50 is a recognized prominent part of the vehicle 10. Here, the recognized prominent part 50 of the vehicle 10 is a distinctive mark affixed to the rear end of the vehicle 10 established by the trailer 40 on each side of the vehicle 10. The point of interest 50 as a prominent part of the vehicle 10 is recognized by the camera wing system 1 in a field of view of the camera 2. The vehicle further comprises two image displays 70 (one on each side of the vehicle), where a selected parts A1, A2 of the field of view FOV are presented to the driver 60 for both sides of the vehicle 10. The vehicle 10 comprises two camera wing systems 1, where one of the camera wing systems 1 is arranged on each side of the vehicle in order to separately detect both point of interests 50 on both sides of the vehicle, where a straight driving is assumed when detecting the points of interests 50 on both sides of the vehicle 10 simultaneously, preferably a cornering is detected when detecting only one point of interests 50 only on one side of the vehicle 10. The recorded field of view FOV of both camera wing systems 1 stays constant while the presented views PV, PV1, PV2 presented to the driver is adapted in accordance to the driving situation DS as shown in FIGS. 3a and 3b when comparing the presented views PV1 and PV2 of the camera wing system 1 on the left side of FIG. 3.

Figure 4:
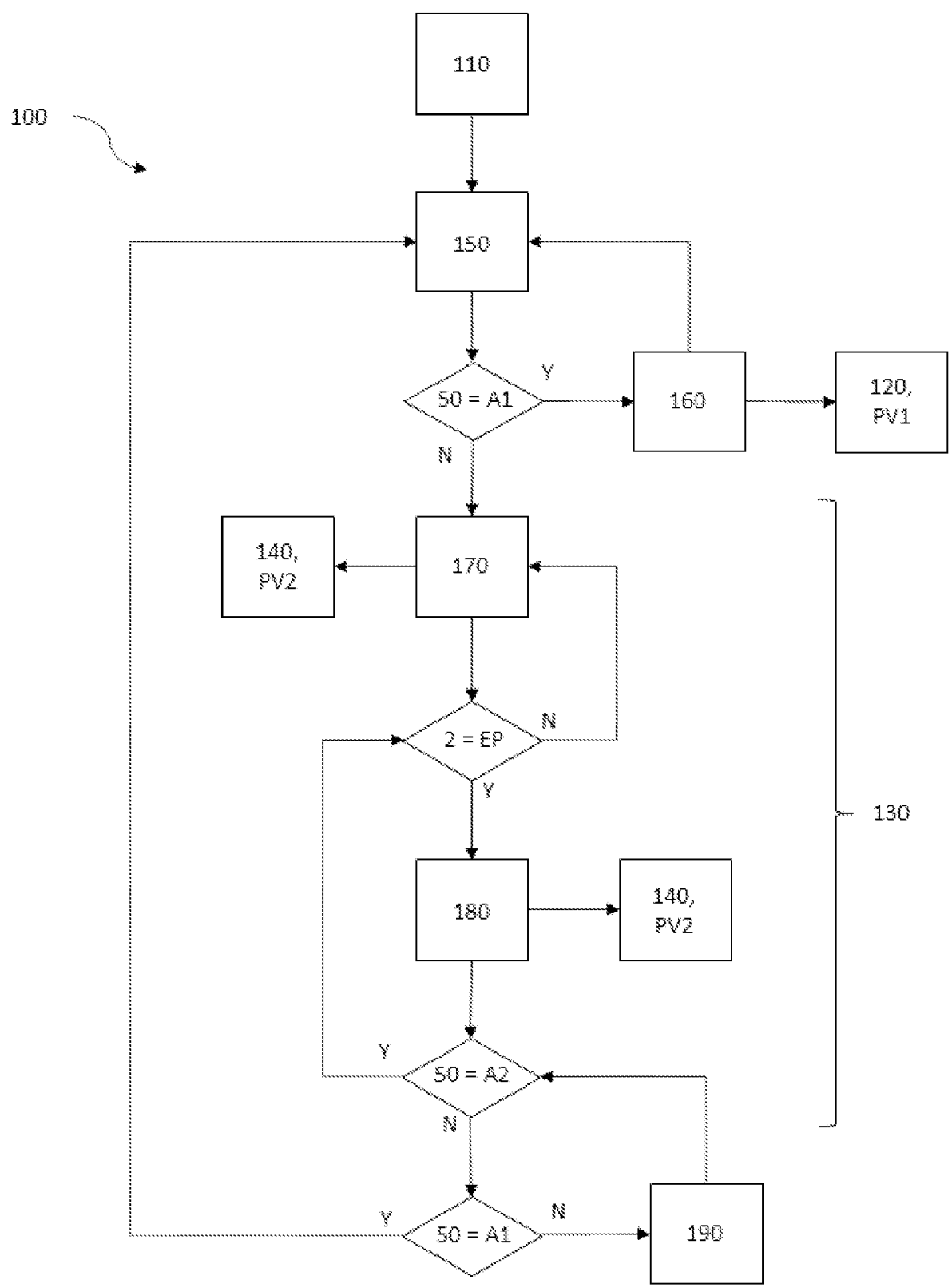
FIG. 4: a schematic illustration of the method to operate the camera wing system.

FIG. 4 shows a schematic illustration of the method 100 according to the present invention to operate the camera wing system 1 according to the present invention mounted on a vehicle 10 comprising at least one camera 2 and a control unit 5, comprising following steps of recording 110 a field of view FOV in a scenery around the vehicle 10 by the camera 2; followed by recognizing 150 the point of interest 50 by a suitable optical recognition software installed and executed on the control unit 5. In case of the point of interest 50 is within the standard area A1 within the field of view FOV, the camera 2 not panning 160 the presented view PV of the camera 2 as long as the point of interest 50 is present within a standard area A1 of the field of view FOV, where the standard area A1 of the field of view FOV is selected to be presented to the driver 60 as a first presented view PV1 followed by providing 120 the first presented view PV1 within the field of view FOV1 to the driver 60. In case of the point of interest 50 leaves the standard area A1 and enters a second area A2 adjacent to the standard area A1 due to a changed driving situation DS within the field of view FOV, the camera 2 automatically panning 130 the presented view PV of the camera 2 to another presented view PV2 different from the previous presented view PV1 in order to keep a point of interest 50 of the vehicle 10 within the presented view PV regardless of a driving situation DS of the vehicle 10 by the camera wing system 1 by moving 170 the presented view PV of the camera 2 in such a way, that the point of interest 50 stays in a middle position in a second present view PV2, which is selected to be presented to the driver 60 instead of the first presented view PV1 in case of the point of interest 50. Subsequently the control unit 5 provides 140 the second presented view PV2 recorded within the field of view FOV to the driver 60. The position of the presented view PV might also be kept constant 180 to let the point of interest 50 moving through the selected second present view PV2 in case of the presented view PV cannot panning further while the point of interest 50 further moves away from the standard area A1 due to the present driving situation DS. Also, here the control unit 5 provides 140 the second presented view PV2 recorded within another field of view FOV2 to the driver 60. The control unit 5 is further adapted to send out 190 a warning signal to the driver 60 in case of the point of interest 50 leaves the recorded field of view FOV.

The embodiments shown herein are only examples of the present invention and must therefore not be understood as being restrictive. Alternative embodiments considered by the skilled person are equally covered by the scope of protection of the present invention.

LIST OF REFERENCE NUMERALS 1 camera wing system according to the present invention
2 camera
21 switchable light filter
22 camera recording unit
3 illuminating system
31 optical system
32 light sources, e.g. an LED or an array of LEDs, preferably emitting in the infrared spectrum
33 beam shaping elements
4 wing
41 first wing surface
5 control unit to control the illuminating system
51 control connection
10 vehicle according to the present invention
30 cockpit of the vehicle
40 trailer of the vehicle 50 point of interest, e.g. a recognized prominent part of the vehicle
60 driver of the vehicle
70 image display in the vehicle to present the selected part of the field of view to the driver
100 method to operate a camera wing system according to the present invention
110 recording a field of view in a scenery around the vehicle by the camera
120 providing at least a part of the recorded field of view to the driver as a presented view
130 automatically moving the presented view of the camera to another presented view different from the previous presented view
140 providing the another presented view to the driver
150 recognizing the point of interest by a suitable optical recognition software installed and executed on the control unit
160 not moving the presented view of the camera as long as the point of interest is present within a standard area of the field of view
170 moving the presented view of the camera in such a way, that the point of interest stays in a middle position in a second present view
180 keeping the position of the presented view constant to let the point of interest moving through the selected second present view in case of the presented view cannot panning further
190 sending out a warning signal to the driver
A1 standard area (within the field of view)
A2 second area (within the field of view)
DS driving situation of the vehicle
EC emission cone, emission direction
FOV field of view
L light emitted from the light sources of the illumination system
PV presented view
PV1 first presented view
PV2 second presented view

The invention claimed is:

1. A camera wing system for a vehicle, comprising:
a camera to record a field of view of the camera in a scenery at least around a rear part of the vehicle,
wherein a presented view is provided to a driver of the vehicle as a part of the field of view,
wherein the camera wing system is adapted to automatically pan the presented view of the camera to another presented view different from the previous presented view in order to keep a point of interest of the rear part of the vehicle within the presented view provided to the driver regardless of a driving situation of the vehicle while the vehicle is on,
wherein the point of interest is recognized by optical recognition software installed and executed on a control unit of the camera wing system,
wherein the control unit is adapted to further control the camera and the automatic panning of the presented view of the camera with respect to the recognized point of interest and to further select a part of the field of view to be presented to the driver for driving the vehicle,
wherein the field of view recorded by the camera is divided into a standard area and at least one second area adjacent to the standard area, and
wherein
in case the point of interest approaches the second area due to a changed driving situation, the control unit is adapted for panning the presented view of the camera in such a way that the point of interest stays in a middle position in a second present view, which is selected to be presented to the driver instead of the first presented view, or
in case the presented view cannot pan further while the point of interest further moves away from the standard area due to the present driving situation, the control unit is adapted to keep the presented view constant to let the point of interest move through the selected second present view.

2. The camera wing system according to claim 1, where the point of interest is a recognized prominent part of the vehicle.

3. The camera wing system according to claim 2, where the recognized prominent part of the vehicle is a distinctive mark affixed to the vehicle.

4. The camera wing system according to claim 1, where the control unit is configured to not cause the presented view of the camera to be panned as long as the point of interest is present within the standard area of the field of view, the control unit is adapted to select the standard area of the field of view to be presented to the driver as a first presented view.

5. The camera wing system according to claim 1, where in case of the point of interest leaves the recorded field of view, the control unit is adapted to provide a warning signal to the driver.

6. The camera wing system according to claim 1, further comprising an illuminating system to emit light to illuminate the field of view of the camera, the camera being sensitive to the light emitted by the illumination system, where the illuminating system comprises at least one optical system comprising one or more light sources and suitable beam shaping elements to define one or more emission cones per optical system.

7. The camera wing system according to claim 6, where at least one of the light sources is an infrared light source.

8. The camera wing system according to claim 1, where the camera comprises a switchable light filter for day and night operation.

9. A vehicle comprising
at least two camera wing systems, each of the at least two camera wing systems comprising
a camera to record a field of view of the camera in a scenery at least around a rear part of the vehicle,
wherein a presented view is provided to a driver of the vehicle as a part of the field of view,
wherein the camera wing system is adapted to automatically pan the presented view of the camera to another presented view different from the previous presented view in order to keep a point of interest of the rear part of the vehicle within the presented view provided to the driver regardless of a driving situation of the vehicle while the vehicle is on, and
wherein the point of interest is a prominent part of the vehicle to be recognized by the camera wing system in a field of view of the camera, and
at least one image display, wherein a selected part of the field of view is presented to the driver as a presented view,
where at least one of the at least two camera wing systems is arranged on each side of the vehicle in order to separately detect point of interests on both sides of the vehicle, where a straight driving is assumed when detecting the points of interests on both sides of the vehicle simultaneously, and wherein a cornering is detected when detecting only one point of interests only on one side of the vehicle.

10. A method to operate a camera wing system mounted on a vehicle comprising a camera, comprising:

recording a field of view in a scenery around the vehicle by the camera, providing at least a part of the recorded field of view to the driver as a presented view, automatically moving the presented view of the camera to another presented view different from the previous presented view in order to keep a point of interest of the vehicle within the presented view regardless of a driving situation of the vehicle by the camera wing system while the vehicle is on, and providing the another presented view to the driver, wherein the camera wing system further comprises a control unit adapted to execute at least one of the following steps:

recognizing the point of interest by optical recognition software installed and executed on the control unit, not moving the presented view of the camera as long as the point of interest is present within a standard area of the field of view, where the standard area of the field of view is selected to be presented to the driver as a first presented view, moving the presented view of the camera in such a way that the point of interest stays in a middle position in a second present view, which is selected to be presented to the driver instead of the first presented view in case of the point of interest enters a second area adjacent to the standard area due to a changed driving situation, or keeping the presented view constant to let the point of interest moving through the selected second present view in a case where the presented view is unable to pan further while the point of interest further moves away from the standard area due to the present driving situation, followed by sending out a warning signal to the driver in case of the point of interest leaves the recorded field of view.

\* \* \* \* \*